(12) United States Patent  (10) Patent No.: US 8,438,089 B1
Wasserblat et al.  (45) Date of Patent: May 7, 2013

(54) METHOD AND APPARATUS FOR TRANSACTION VERIFICATION

(75) Inventors: Moshe Wasserblat, Maccabim (IL); Gudmundur Kristjansson, Alkmaar (NL); Cromwell Fraser, Ashford (GB); Zvika Moretzky, Tel-Aviv (IL); Bastiaan Schonhage, Amsterdam (NL); Yaron Morgenstern, London (GB); Tzach Ashkenazi, Petach-Tikva (IL); Ezra Daya, Petah-Tikwah (IL); Oren Pereg, Amikam (IL)

(73) Assignee: Nice Systems Ltd., Raanana (IL)

( * ) Notice: Subject to any disclaimer, the term of this patent is extended or adjusted under 35 U.S.C. 154(b) by 0 days.

(21) Appl. No.: 13/408,473

(22) Filed: Feb. 29, 2012

Related U.S. Application Data

(60) Provisional application No. 61/597,246, filed on Feb. 10, 2012.

(51) Int. Cl.
  *G06Q 40/00* (2006.01)
(52) U.S. Cl.
  USPC ............... 705/35; 705/26.8; 705/39; 705/1; 704/270; 726/2; 707/737

(58) Field of Classification Search ............. 705/1, 26.8, 705/35, 39; 704/270; 726/2; 707/737
See application file for complete search history.

(56) References Cited

U.S. PATENT DOCUMENTS

| | | | | |
|---|---|---|---|---|
| 5,991,739 | A * | 11/1999 | Cupps et al. ................. | 705/26.8 |
| 6,014,647 | A * | 1/2000 | Nizzari et al. .................. | 705/39 |
| 6,275,940 | B1 * | 8/2001 | Edwards et al. .................. | 726/2 |
| 7,076,427 | B2 * | 7/2006 | Scarano et al. ............... | 704/270 |
| 8,204,884 | B2 * | 6/2012 | Freedman et al. ............ | 707/737 |
| 2006/0089837 | A1 * | 4/2006 | Adar et al. ........................ | 705/1 |

* cited by examiner

*Primary Examiner* — Samica L Norman
(74) *Attorney, Agent, or Firm* — Pearl Cohen Zedek Latzer, LLP

(57) ABSTRACT

A transaction verification system and method may include receiving an interaction record describing communications between parties regarding a transaction event. The interaction record may include interactions having multiple communication formats. Transaction data describing transaction parameters input into a trading system during the transaction even may be compared to the interaction record. A matching score may be calculated that indicates a level of similarity between the interaction record and the transaction data. The matching score may be calculated for multiple of transaction events in an interaction log, and an interaction log score may be calculated.

20 Claims, 9 Drawing Sheets

FIG. 3

| Word | Start Time (ms) | End Time (ms) | Certainty |
|---|---|---|---|
| buy | 42300 | 42700 | 85 |
| eight | 44500 | 45100 | 80 |
| hundred | 45100 | 45500 | 90 |
| shares | 46000 | 46400 | 90 |
| of | 46500 | 46900 | 70 |
| Microsoft | 47100 | 47600 | 50 |
| at | 47700 | 48200 | 85 |
| three | 48300 | 48600 | 75 |
| dollars | 48660 | 49500 | 95 |
| fifty | 49530 | 50000 | 80 |
| cents | 50100 | 50300 | 88 |

FIG. 5A

| Word | Start Time (ms) | End Time (ms) | Certainty | Lexicon Category |
|---|---|---|---|---|
| buy | 42300 | 42700 | 85 | Transaction instruction |
| eight | 44500 | 45100 | 80 | Numeric |
| hundred | 45100 | 45500 | 90 | Numeric |
| shares | 46000 | 46400 | 90 | Transaction subject |
| Microsoft | 47100 | 47600 | 50 | Company |
| three | 48300 | 48600 | 75 | Numeric |
| dollars | 48660 | 49500 | 95 | Currency |
| fifty | 49530 | 50000 | 80 | Numeric |
| cents | 50100 | 50300 | 88 | Currency |

FIG. 5B

| Field | Word(s) | Start Time (ms) | End Time (ms) | Field Confidence |
|---|---|---|---|---|
| Transaction instruction | buy | 42300 | 42700 | 0.6 |
| Amount | 800 | 44500 | 45500 | 0.8 |
| Transaction subject | stocks | 46000 | 45400 | 0.5 |
| Price | 3.5 | 48300 | 50000 | 0.8 |
| Currency | dollars | 48660 | 50300 | 0.7 |
| Company | Microsoft | 47100 | 47600 | 0.7 |

METHOD AND APPARATUS FOR TRANSACTION VERIFICATION

CROSS-REFERENCE TO RELATED APPLICATIONS

This application claims priority from U.S. Provisional Patent Application 61/597,246, filed Feb. 10, 2012, which is hereby incorporated by reference in its entirety.

FIELD OF THE INVENTION

The present invention is related to transaction verification, and comparing interactions leading up to a transaction to the transaction submitted into a system.

BACKGROUND

Large organizations, such as commercial organizations, financial organizations or public safety organizations may conduct numerous transactions with other parties such as customers, users, suppliers or other persons on a daily basis. Before executing a transaction, many interactions may occur between organization representatives and the other parties to confirm and understand the desired terms of the transaction, such as quantity and price. Organizations may require manual processing of the transactions terms in order to verify that the terms agreed to in the interaction match the terms of the actual transaction. For example, in a trading floor setting, customers may request a trade to be made on their account and describe the desired trade to a trader. The trader may enter the trade order into a system, which may first be sent to a processing office to record and verify that the transaction is correct. After receiving confirmation, the processing office may then settle the trade and fulfill contractual obligations related to the trade. Similar steps may occur with any large organization handling a large volume of transactions. A manual settlement process, by using a processing office and personnel to manually verify a transaction, may delay performance of contractual obligations if errors are found. Delays may be costly and risky for parties on both sides of a transaction. Trades with marginal errors may be allowed to settle, or trades with significant errors may not settle at all. Parties may be exposed to position risk, increased funding requirements that come with greater uncertainty in the manual settlement process, and claims or penalties.

SUMMARY

A transaction verification system and method may receive an interaction record describing communications between parties regarding a transaction event. The interaction record may include interactions having multiple communication formats. Transaction data describing transaction parameters input into a trading system during the transaction event, or during a manual order process of a transaction, may be compared to the interaction record. A matching score or rating may be calculated that indicates a level of similarity between the interaction record and the transaction data. The matching score may be calculated for multiple of transaction events in an interaction log, and an interaction log score may be calculated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is an example of converted speech data, according to an embodiment of the invention;

FIGS. 5A and 5B are examples of interaction data used in the calculation of an indicator, according to an embodiment of the invention;

Figure 1:
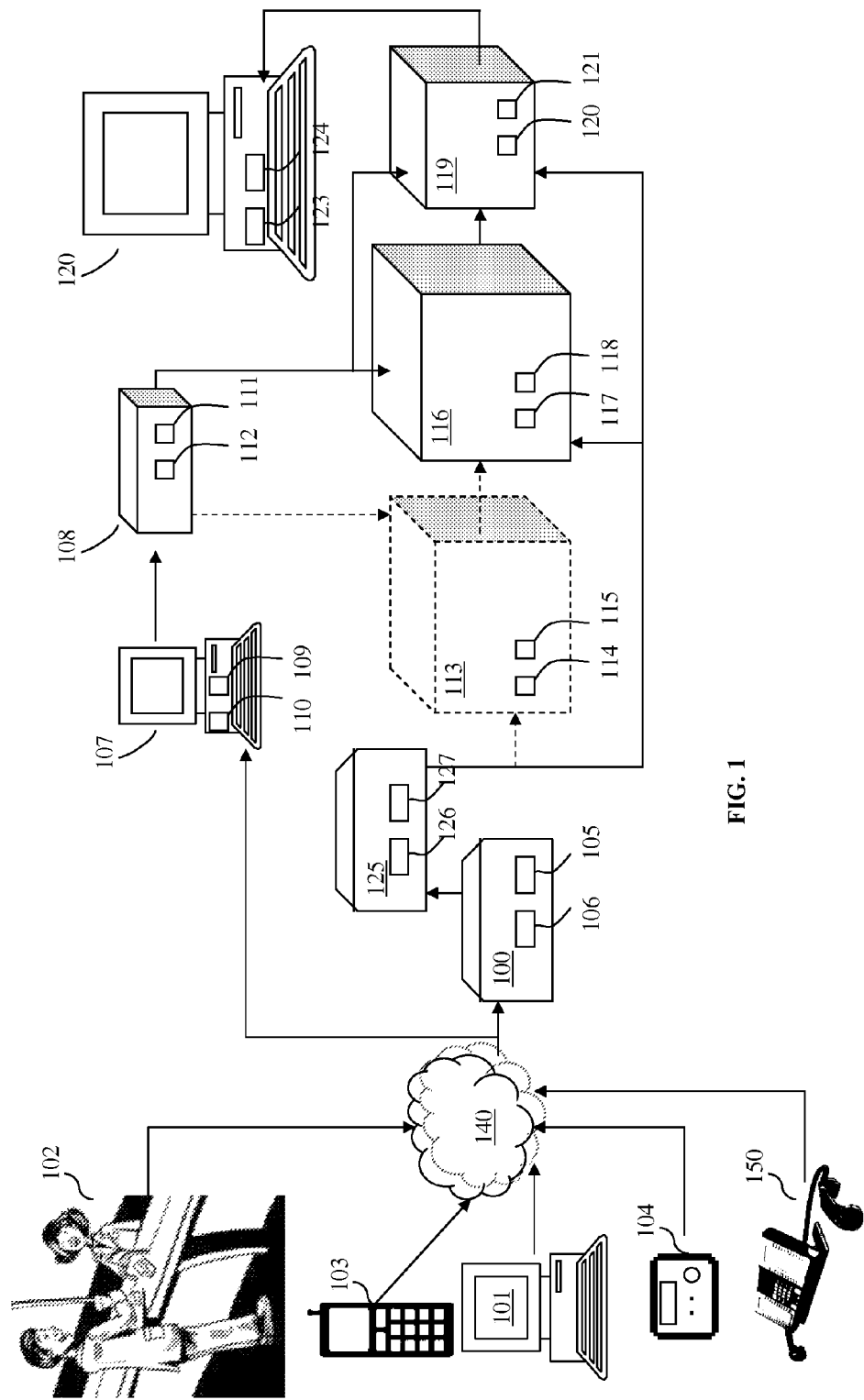
FIG. 1 is a schematic illustration of a system for transaction verification, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment, a set of communications describing a transaction may be received; e.g., over time or as a group. An indicator, score or rating may be determined or calculated describing how accurately the transaction matches the description of the transaction in the plurality of communications. The indicator may be numerically or verbally expressed.

When used herein, a telephone call may include devices and networks beyond the "plain old telephone system" (POTS), such as voice over Internet protocol (VOIP) telephone calls using personal computers. "Calling" in the context of a person taking action may including using a traditional telephone or other device such as a VOIP telephone, cellular telephone, or other device, to speak with another person. Furthermore, embodiments of the invention may allow for a user to contact an agent via other methods, such as on-line chat messaging (e.g., simultaneous or substantially simultanious transmission of text-based messages). "Calling" in the context of a process or processor taking action may mean, for example, executing a software process, requesting a software process perform some function or return some result, etc. "Calling" may also occur over trading turret systems (e.g. a specialized telephony key system, sometimes referred to as a dealer board, used by financial traders in conjunction with other tools that may make up a unified trading communications platform), allowing users to visualize and prioritize incoming call activity, or place or participate in multiple calls or interactions simultaneously over multiple handsets or speaker units.

When used herein, the "web" may refer to the World Wide Web, which may include the Internet and/or an Intranet. The web may be used interchangeably with the Internet and/or Intranet, as the web is a system of interlinked hypertext documents and programs (e.g., VOIP telephone programs, streaming media programs) accessed via the Internet and/or Intranet.

When used herein, "trader" may mean any agent or representative of a business or organization, employed to conduct a transaction or trade on behalf of the business and/or clients or customers. A trader may also act as an intermediary between a customer and organization. For example, a trader may be a teller, broker, buyer, seller, register, stock trader, bond trader, dealer, merchant, salesperson, or other similar agent.

Communication channels may include, for example, Internet, Intranet, public network, private network, local area network, wide area network, messaging via text messaging, short message service (SMS) messaging, e-mail messaging, blogs or micro-blogs, radio, and telephone or calling channels. Each channel may have a different media type or format, for example, a VOIP format, a POTS telephone format, an SMS format, an e-mail format, or other formats. Within Internet interactions, multiple channels may be used. For example, a telephone call may be conducted via the Internet on one channel using one format, a web-browsing session may take place on a second channel using another format, and a text interaction may take place on a third channel using a third format. Interactions may be recorded between a user or customer and a support center agent over the multiple communication channels, such as the customer accessing an online support website, calling a call center, text messaging (communicating via text messaging) a support center, etc. Interactions may also occur between two traders or any two parties of a transaction. The recorded interactions may each have different media types or formats, such as, voice recordings, SMS messages, web screenshots, etc. The recorded interactions may be stored as raw data or may be processed, for example, by extracting information from the interactions according to predefined rules.

An interaction may be a discrete communication, such as a telephone conversation, e-mail message, or text message, between two or more parties, for example, between a customer and a trader, between two traders, or between two parties of a trade. A transaction may be, for example, any trade, order, sale, purchase, or other financial arrangement where value is exchanged between two or more parties. A group or set of interactions may describe, relate to or be associated with the same transaction or trade, and a group or set of interactions may constitute an interaction record. Alternatively, one interaction may constitute an interaction record if the entire interaction describes a transaction event. For example, interaction A may be an SMS communication where party X requests a price for a security (e.g. a stock, a bond) from party Y. Interaction B may be a telephone call where party Y gives the price to party X. Interaction C may be a message via Facebook where party X requests party Y to purchase a certain amount of the securities on behalf of party X. The same securities may be discussed in interactions A, B and C, and interactions A, B and C may be related or grouped together, and may cause a transaction event (e.g., the purchase of securities) to take place. Interactions A, B, and C may be grouped together as an interaction record that describes the communications surrounding the transaction event. Interactions A, B, and C may be stored together in memory, or stored separately but linked together by, for example, a pointer or referenced together in a database. In another example, interaction D may be a telephone call where party X requests a price and quantity and party Y agrees to purchase a security on behalf of party X, according to the requested price and quantity. Interaction D may thus constitute an interaction record. Multiple interaction records may be grouped into an interaction log that describes communications surrounding multiple transaction events.

Embodiments of the invention may verify transactions occurring in an interaction-rich environment or organization, such as a bank, a trading floor, an insurance company, financial institution, a service provider, or other organizations. Interactions may occur between two or more parties, including customers, users, traders, customer representatives, organization members or other parties regarding a transaction. Transactions may include any trade, order, sale, purchase, or other financial arrangement where value is exchanged between two or more parties. Interactions may include multiple communication channels and may be captured in various communication formats. Interactions may be in person at a physical location or through virtual exchange through online video interaction. Interactions may be through vocal-only exchanges such as telephone calls, cellular telephone calls, VOIP, or through trading turrets. Interactions may also occur through computer terminals connected through the web, using different websites such as social networking sites or other online forums. Social networking sites may include for example Facebook, Twitter, Foursquare, or other similar websites where messages are posted or exchanged between users with accounts, and the messages may be viewed on the social networking website by other users within a social network. Interactions may occur through other data connections such as facsimile, e-mail, chat clients, or SMS messages for example. Interactions may include a combination of some or all of these communication channels. Interactions may be captured or recorded in communication formats may include auditory segments, video segments, textual interactions, and additional data. The capturing of voice interactions, or the vocal components of other interactions, such as video, can employ many forms, formats, and technologies, including trunk side, extension side, summed audio, separate audio, various encoding and decoding protocols such as G729, G726, G723.1, and other protocols.

An embodiment of a transaction verification method may include receiving an interaction record describing or including communications between two or more parties. The communications may regard or surround a transaction event, such as a trade or order. A representative of a business or organization may enter the trade or order into an order management system or internal server. An order management system may be any computer platform or system that aggregates and organizes trades or orders that are conducted in an organization. Trades may be related to stocks, options, derivatives, futures contracts, bonds, or any other financial instrument or item traded. The order management system may store transaction data describing parameters surrounding the trade or order. Such parameters may include quantity, trade date/time, broker information, transaction type, order identification (ID), price, net purchase amount, or other relevant information.

Discrepancies, differences or irregularities may exist between transaction data entered into the order management system and desired transaction parameters discussed between the two or more parties. The communications between the parties, captured in an interaction record, may reveal a true understanding of the desired transaction parameters. Reviewing the interaction record or comparing the interaction record with the transaction data may limit discrepancies or allow transaction parameters to be rectified in a timely manner after the parameters have been entered into the order management system. The transaction data may be received from an internal server and a matching score or indicator may be determined or calculated. The indicator may indicate the level of similarity between the interactions surrounding the transaction and the transaction data entered into the order management system by the trader or representative. In one embodiment, similarity may mean that the details of the transaction described in the interactions match the details of the transaction, for example, the number of shares or quantity of goods match; the price or price range in the transactions match the price of the transaction, etc. The indicator may verify whether the trader or representative entered the correct trade or transaction parameters desired by a customer and communicated to the trader during their interactions. A low matching score may indicate that a trade or order was not likely to have been entered incorrectly, and a high matching score may indicate that the trade or order was likely to have been entered correctly. The interactions between parties, the resulting transactions, and calculated matching score may be stored for searching purposes or later review, and a low matching score may alert the trader, his/her superiors or others of a mistake in the entered order.

FIG. 1 is a schematic illustration of a system for transaction verification, according to an embodiment of the invention. Customers or representatives of customers may contact a trading service or business to perform a transaction with sellers or on an exchange for financial instruments, for example. Many interactions in different communication formats between customers and traders may travel through a central network 140 and be recorded or stored in a capture or logging engine 100 as interaction records. Interaction records may be record different types of interactions such as in-person 102, by telephone 103, by computer terminal 101 over the internet, by text-enabled device such as a beeper 104, through a trading turret 150, or through other communication formats or devices where two or more parties communicate information about a transaction. In-person communication 102 may be, for example, recorded by video or audio recording equipment in a walk-in-center or may include videoconferences through a program such as Skype which may be recorded. Telephone 103 or vocal communication formats may include landline, mobile, satellite telephone or VOIP. Communication by computer terminal 101 may include social networking sites, chat clients, e-mail messages or other data messages. A combination of all or some communication formats may be used. Voice data may pass through a Private Automatic Branch Exchange (PABX) which integrates private and public telephone lines, including VOIP. VOIP channels may pass through a voice over internet protocol (IP) server. Voicemail messages may also be captured and processed and may include multi-sided conversations. Interactions may be via vocal sources such as microphone, intercom, vocal input by external systems, broadcasts, files, streams, or any other source. Additional sources may also include facsimile messages which may be processed by Object Character Recognition (OCR) systems, or other systems.

Interaction records from multiple sources may be received, captured and stored by a capture engine 100. Capture engine 100 may record, copy, or capture interaction records (each possibly associated with a customer, client, or one or more other persons or entities) having multiple communication formats via, for example, central network 140. Capture engine 100 may include memory 105 for storage and processor 106 for executing storage operations.

Capture engine 100 may include a computing platform executing one or more computer applications. The captured data is optionally stored in storage or memory 105 which may be a mass storage device, for example an optical storage device such as a CD, a DVD, or a laser disk; a magnetic storage device such as a tape, a hard disk, Storage Area Network (SAN), a Network Attached Storage (NAS), or others; or a semiconductor storage device such as Flash device, memory stick, or similar storage devices. The storage may be in common or separate for different types of captured interactions and different types of communication formats. The storage may be located onsite where the interactions are captured, or they may be located in a remote location. The capture or storage components may serve one or more sites of a multi-site organization.

Unstructured or raw speech data from interaction records (e.g., speech data from audio recordings, text data, and/or other data) may be converted to structured speech data using, for example, a speech recognition engine 125. Speech recognition engine 125 may include a memory 126 and processor 127 to execute speech conversion functions. Unstructured speech data may be analog or digital audio recordings of a telephone or in-person interaction or include full-text data from e-mail messages or SMS messages, for example. Speech recognition engine 125 may use speech recognition algorithms such as phonetic indexing or a Large Vocabulary Conversational Speech Recognition (LVCSR) algorithm adapted to recognizing transaction parameters in conversation. For parsing data communication such as e-mail messages or social networking messages, the speech recognition engine 125 may also use a textual content extractor or a data mining algorithm adapted to a transactional environment. The structured speech data may include words recognized in the conversation, the location of the words in the interaction recording, a certainty level for each word, or other attributes of speech or text that allows a computer or user to easily search through the interaction record. The certainty level may indicate the certainty, likelihood, or probability that the algorithm correctly identified the word and its contextual meaning within the interaction record at a particular location. The certainty level may depend on the sound quality of an audio interaction record, and a high signal to noise ratio (indicating more background noise presenting in the record) may correlate to a lower certainty level. Other factors that influence certainty level may include the tone, voice inflection or accent of the individuals on the record, for example. In an interaction record that includes data communication, the certainty level may depend on the number of times the word is repeated within a message or the number of other words used in the interaction, for example.

Traders or representatives interacting with customers or other traders may use the same communication formats as the customers requesting a transaction or trade, such as in-person communication 102, voice communication including telephone communication 103, data communication through a computer terminal 101, by text-based device 104, or other formats. Based on interactions with customers, traders may enter trade or order information into a trading system 107, according to the transaction requested by the customer and interpreted by the trader. The trade or order information may describe transaction parameters such as customer ID, trader ID, price, transaction subject (e.g. trade, swap, option), amount, currency, or other relevant parameters. The trade may be stored as transaction data in an order management system 108 or server. Transaction data may be stored in various suitable formats and may organize the transaction parameters in a data table. The trading system may include a memory 109 to store trading applications and a processor 110 to execute trading functions. Order management system 108 may also include a memory 111 and processor 112.

In one embodiment, interactions or communications may be captured in the capture engine 100 and converted to structured speech data in the speech recognition engine 125. The converted interactions, along with transaction data stored on the order management system 108, may be sent to a tagging engine 113 where communications or interaction records and transaction data that are part of the same transaction event are associated or affiliated with one another. Multiple communications or interactions may be grouped together to form an interaction record, and tagging engine 113 may group separate communications together with tag identifications in order to compile a full interaction record that corresponds to transaction data. Interaction records may be data structures, such as linked lists, arrays, or hash tables that reference multiple related communications or interactions captured in capture engine 100. Tagging engine 113 may also associate interaction records with corresponding transaction data. Interactions or communications may be received in bulk and processed as a group, or may be received serially, e.g., as they occur or are received by the system. In the latter case, interactions may be added to interaction records as they are received.

The association of interaction records and transactions may occur, for example, by tagging or logging the interactions and transaction data with an order identification number, customer name, product name, time stamp, or other identifying information, for example. The tagging engine 113 may include a memory 114 for storing tags associated with different interaction records and corresponding transaction data, and a processor 115 for executing tagging functions. The tags or IDs may be associated with communications or interaction records and corresponding transaction data by for example a hash table or similar data table pointing to multiple data types. Each hash table entry may, for example, be a linked list of pointers that includes, a pointer referring to an address in memory that stores an order ID, a pointer referring to an interaction record, and a pointer referring to transaction data. Other tags or identifying information may be included in the linked list. The tagging engine may allow interaction records and transaction data to be easily searchable and retrieved for later review. The tagging engine may send tagging information to a context engine 116 that provides an indicator, matching score, or rating and determines whether the associated interaction record and transaction data sufficiently match. In another embodiment, the interaction record and transaction record may not be tagged or associated by a tagging engine 113 and instead sent directly to context engine 116 for scoring or matching, or both.

Context engine 116 may calculate or determine a matching score that indicates a level of similarity between the interaction record and transaction data. Context engine 116 may include a memory 117 for storing scoring applications and a processor 118 to execute calculations. Context engine 116 may detect or isolate interaction data within an interaction and extract the interaction data describing the interactions that constitute the transaction event. The extracted interaction data may include a data table describing the words recognized and used in the interaction to request a transaction. Context engine 116 may then compare the extracted interaction data with the transaction data and calculate a matching score based on the comparison. A low matching score may indicate a mismatch or a poor match between the transaction parameters entered into the trading system 107 and the communications describing the desired transaction parameters. A high matching score may indicate a match or a good match (and high similarity) between the transaction parameters entered into the trading system 107 and the communications describing the desired transaction parameters. For example, if the client requested a purchase of 100 shares of AT&T at $50/share, and the transaction executed was 100 shares of AT&T at $47/share, a high score of 90 out of 100 may be generated. If the client requested a purchase of 100 shares of AT&T at $50/share, and the transaction executed was 100 shares of Apple at $50/share, a low score of 10 may be generated. A high matching score may verify that the transaction parameters were entered correctly or mostly correctly by a trader or representative. Context engine 116 may send or transmit the matching score to a central server 119. Central server 119 may receive and store all tagging information, interaction records, trade orders (represented as transaction data), and matching scores. Information on central server 119 may be accessed by a display device 122. The display device 122 may display a visualization of the interaction record, interaction data, transaction data, and matching score calculated by context engine 119. A low matching score may cause an alert to be generated, which may also be displayed on display device 122. The display device 122 may be connected to the trading system 107 used by the trader so that the trader may easily review prior transactions, search through other transactions, generate a transaction verification report, or other functions. Central server 119 or another server may, in some embodiments, include all or part of the functionality associated in some embodiments with other components, such as matching, creating scores, etc.

Some or all of capture engine 100, central network 140, speech recognition engine 125, trading system 107, order management system 108, tagging engine 113, context engine 116, and central server 119 may, for example, be software executed on one or more processors on different computing devices, or they may be part of the same centralized system or server, sharing processing and memory units, or executed by multiple processors or memory units. Processor(s) 106, 110, 112, 115, 118 and 120 may execute code or instructions to carry out part or all of the methods disclosed herein. Any or all of processor(s) 106, 110, 112, 115, 118 and 120 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 126, 109, 111, 114, 117, and 121 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 2:
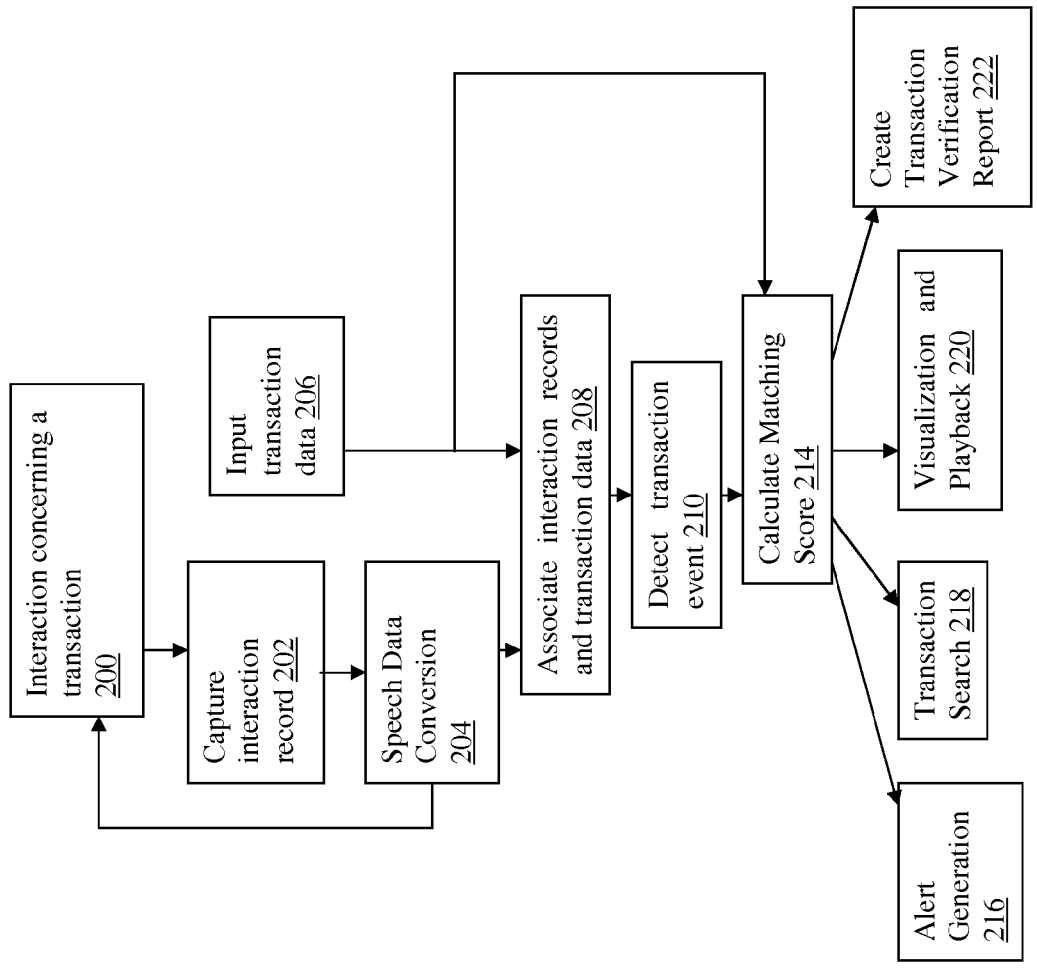
FIG. 2 is a flowchart of a method of transaction verification, according to an embodiment of the invention.

FIG. 2 illustrates a method of transaction verification, according to an embodiment of the present invention. The embodiment shown in FIG. 2 may be carried out by a system such as that shown in FIG. 1, but other systems may perform embodiments of the invention. In operation 200, an interaction regarding a transaction event may occur between a customer and a trader or representative. For example, a customer may speak to a broker by telephone and discuss a trade, a customer may communicate with a broker by SMS to finalize a trade, etc. The interactions may be logged or captured into an interaction record in operation 202, while the trader executes the transaction, creating transaction data in operation 206 that includes information on the transaction's parameters. In operation 204, the unstructured speech data of the captured interaction record is converted into structured speech data. The structured speech data may describe or represent words recognized and where they may be found within the interaction record. The operations of an interaction being captured, recorded and converted may be repeated or iterated as interactions occur.

In operation 208, captured interactions or communications between, for example, a trader and a customer may be associated or grouped together as part of one interaction record. Separate communications occurring at different times, for example, may concern the same transaction event, where a trader enters transaction parameters into a trading system. Operation 208 may tag or associate each communication as they are captured, or as a group (e.g., by a processor reviewing a large amount of communications), and group related communications into interaction records. The communications, interaction record and accompanying transaction data describing the transaction parameters may be associated or related to the same order identification number or tag. Association may also occur through other kinds of tags, such as customer identification or by timestamp. Generally, a tag may be a word or number that references one or more pieces of data. A tag may be embodied in a pointer that references a memory address, an index in a lookup table, or other similar data structures. In one embodiment, when multiple interactions may constitute an interaction record that relates to a transaction event, each interaction captured may be tagged with identifying information. Tagging may occur manually or a tagging engine may tag source-identifying information to each interaction captured, such as customer ID, IP address, broker ID or other information. Transaction data entered by a trader may include transaction parameters describing the terms of the transaction and source-identifying information. The tagging engine may determine, based on the source-identifying information tagged with each interaction and the source-identifying information in the transaction data, which interactions constitute an interaction record that may associate with the appropriate transaction data. For example, if customer X has interactions A, B, and C with party Y culminating in a transaction event, interactions A, B, and C may each be tagged with information identifying customer X, such as customer X's user ID and timestamp, or other information. During the transaction event, party Y may enter transaction data including transaction parameters and customer X's user ID, timestamp, and account number, for example. A tagging engine may associate interactions A, B, and C as belonging to the same interaction record and related to the transaction event, based on the tagging information (e.g. user ID, timestamp, etc) previously associated with those interactions and the transaction data. In another embodiment, the tagging engine may add additional tagging information to the related interaction record and transaction data, such as an order ID. Other methods may be used. In another embodiment, an interaction D may be the sole interaction between party X and party Y before party Y enters transaction data into a trading system. A tagging engine may associate interaction D and transaction data by tagging.

In operation 210, interaction data may be detected, for example, within the interaction record. Detection operation 210 may include extracting a set of interaction data from an interaction record and calculating an event confidence score. An event confidence score may indicate a probability that extracted interaction data describes an actual transaction. If the event confidence score is higher than a threshold event confidence score, then interaction data describing a transaction may be deemed detected, and the extracted interaction data may be compared with corresponding transaction data to calculate a matching score in operation 214. The extracted interaction data may be, for example, a table describing transaction parameters requested by a customer, sorted into relevant transaction terms or words spoken or sent during the interaction. The table may include information on word locations and the certainty that the words exist in the interaction at a detected location or at a detected timestamp. The interaction data may include fields such as, transaction instruction, amount, transaction subject, price, currency, company, exchange, start times of each field, end times of each field or other information. Other interaction data may be used. Operation 210 may be carried out by, for example, a state machine to accomplish detection and extraction of interaction data.

In operation 214, a matching score or rating between the interaction record and transaction data may be calculated. The score may be calculated, for example, by comparing respective data fields of the extracted interaction data and the transaction data. After calculation of the matching score, the matching score may be stored along with the interaction record, interaction data, and transaction data. If the matching score is lower than a predefined matching score or threshold, an alert may be generated in operation 216. The alert can be transferred to organization employees by e-mail messages, popup application, SMS message or any other suitable communication. The alert mechanism may configurable by a user, such as a customer or trader. Configurable parameters may include for example the predefined confidence score threshold, the amount of interactions that trigger an alert and the alert recipients.

The results of the matching score may also be accessed in a transaction search in operation 218. For example, using a search component a user may search a transaction events storage in order to find and retrieve a specific interaction. For example, search may be according transaction amount; transaction instructions such as buy, sell, transfer, order, convert or other types of instructions; transaction subject such as stock, bonds, merchandise name or other parameters; transaction price; transaction currency, such as dollars, euros, or other currency; or any combination of the aforementioned search terms. When populated, the search results may be displayed and sorted in a descending order according to the relevancy to the search query.

Other further steps may include, for example, visualizing the results in operation 220 and playing back the interaction record with the transaction data, or creating a transaction verification report 222.

Referring to operation 204, speech data conversion may include word spotting or a phonetic indexing and search algorithm. The conversion may refer to a lexicon or predefined list of words to process the unstructured speech data, and the conversion may output the location and word certainty level for each detected word that is part of the relevant lexicon. The word certainty level may reflect the probability that the detected word exists in the interaction record and may be in the range of for example 0-100, where a higher number indicates higher certainty.

The speech data conversion algorithm may use a transaction-related lexicon that is related to the possible transaction parameters. The transaction lexicon may include several transaction-related lexicon categories. An example of sorting lexicon with lexicon categories may be the following:

Numeric lexicon: one, two, three, four, five, six, seven, eight, nine, ten, eleven, twelve, thirteen, fourteen, fifteen, sixteen, seventeen, eighteen, nineteen, twenty, thirty, forty, fifty, sixty, seventy, eighty, ninety, hundred, thousand, million and billion;

Transaction currency lexicon: dollar, cent, euro, pound, yen, hone, real, Canadian Dollar, Australian Dollar, Peso;

Amount terms lexicon: amount, sum, price, total;

Transaction instruction lexicon: buy, sell, transfer, order, convert;

Transaction subject lexicon: stock, bonds, options, call, put, merchandise etc.;

Company lexicon: Microsoft, IBM, Google, Amazon, GM, Ford, or other companies offering financial instruments;

Other lexicon: frequently used words in language.

Other arrangements of lexicon and lexicon categories may be used.

According to an embodiment of the present invention, FIG. 3 illustrates an output of converting unstructured or raw speech data from an interaction record to structured speech data, as described in operation 204 in FIG. 2. As an example, an interaction record may include a telephone call to a trader, where a customer requests, "Buy eight hundred shares of Microsoft at three dollars and fifty cents." Interaction records may include other communication formats such as SMS messaging or e-mail communication. In this example, for purposes of clarity, one telephone call may constitute the interaction record. A trader, in response to the telephone call, may input transaction data into an order management system. The raw audio data from the telephone call may be converted to a data table 300 as structured speech data, illustrated in FIG. 3. Each word 302 may be recognized by, for example, a speech recognition engine, and logged or labeled by its start time 304, e.g. a time stamp that describes when the beginning of a word is spoken, or end time 306, e.g. a time stamp that describes when the end of a word is spoken. The table may include a certainty level 308 indicating a probability that a speech recognition algorithm correctly identified or recognized the word.

Figure 4:
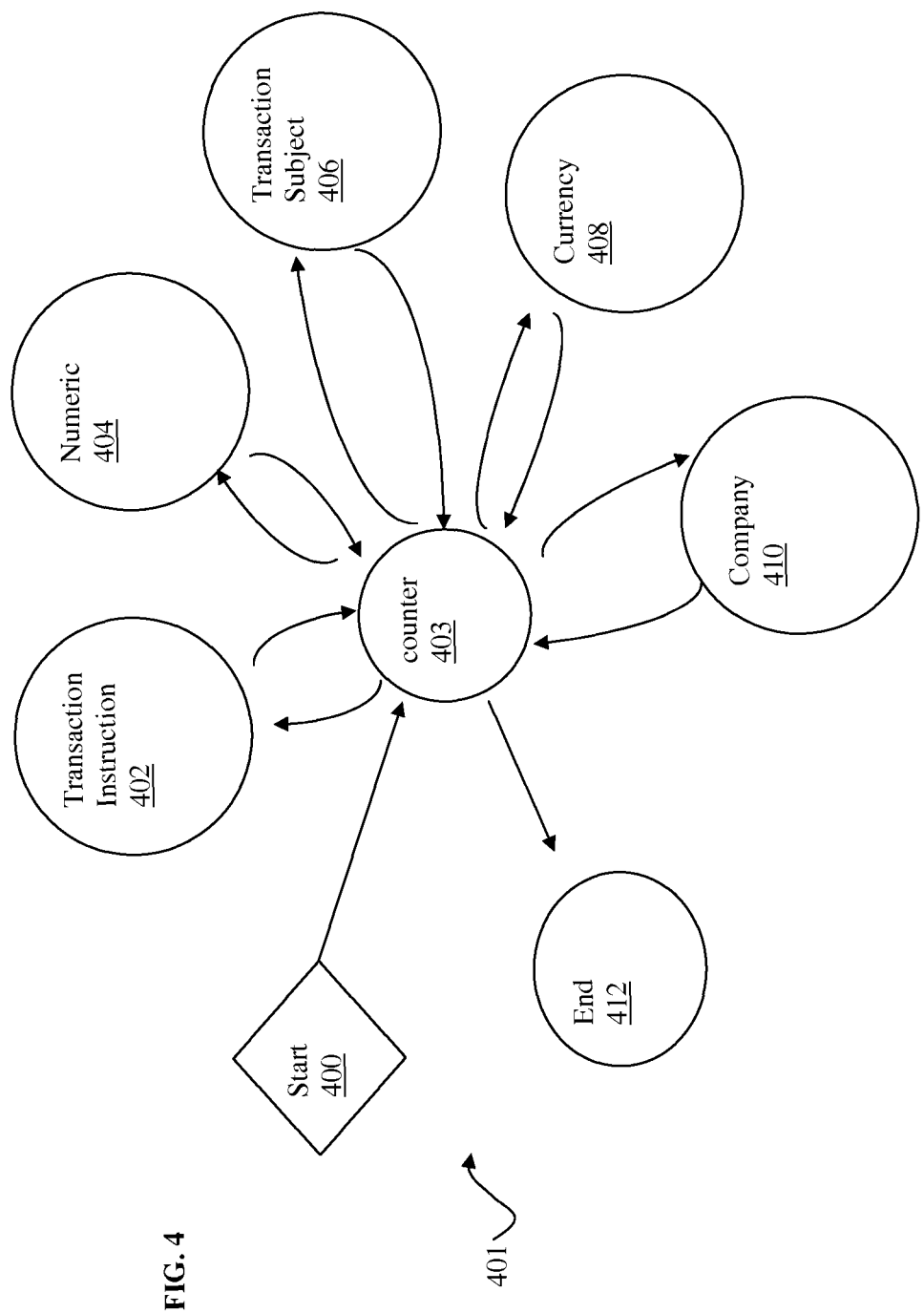
FIG. 4 is a chart of a state machine in an event detection step, according to an embodiment of the invention.

FIG. 4 illustrates a state machine that may be used for detecting interaction data within an interaction record (operation 210 in FIG. 2), according to an embodiment of the present invention. A state machine may be executed, for example, by one of processors 118 and 127. The state machine may take as input the structured speech data from the interaction record, converted in operation 204 of FIG. 2 and illustrated in FIG. 3. The structured speech data may include recognized lexicon words along with their location and certainty. The words in the structured speech data may be ordered by time and location, or according to their location in the interaction record. The state machine may select each word from the structured speech data. A transition between states may be set according to the type of words extracted from the structured speech data. A word type may be set according to the lexicon categories it belongs to. For example, for the word 'fifty', the type may be numeric.

In one embodiment, shown in FIG. 4, a state machine 401 may include six states: transaction instruction state 402, numeric state 404, transaction subject state 406, currency state 408, company state 410, counter state 403, and end state 412. Other numbers of states and other states may be used. The states may correspond with or relate to the lexicon categories used in the speech recognition engine. The state machine 401 may be configured to have other states, depending on the relevant transaction parameters and lexicon categories. At start state 400, the state machine 401 may take as input structured speech data from an interaction record. A first transition to counter state 403 may occur. Counter state 403 acts as a buffer to determine whether to select the next word in the structured speech data or transition to end state 412. Counter state 403 may keep track of how many words have been selected, or how many words have been stored in each state, for example. Counter state 403 may also keep track of the number of words selected that are not stored any state. For example, words that are commonly used in language but do not belong to any of the lexicon categories may be tallied as words not stored in any state. If the counter state 403 counts a certain amount of words that do not belong in any other state above a predetermined threshold, counter state 403 may directly transition to end state 412. By transitioning to end state 412 upon reaching the predetermined threshold, the counting mechanism may serve as an error tolerance threshold for each state and the interaction record.

As each word is selected from the structured speech data, counter state 403 may transition to any of states 402, 404, 406, 408 or 410 if a selected word belongs to that state's lexicon category, or counter state 403 may count the word as not belonging to any state. Each of state 402, 404, 406, 408 or 410 may then store the word (along with its location and certainty) in a linked list or memory pointer. For example, a first selected word may be 'buy'. The counter may transition to transaction instruction state 402, and 'buy' may be stored in the state before the state transition to counter state 403. Counter state 403 may note that a first word has been extracted, and that transaction instruction state 402 has been entered and exited. A second selected word may be 'eight', and counter state 403 may transition to numeric state 404. Numeric state 404 may store the word, and transition back to counter state 403. Since many numeric words may occur in an interaction, counter state 403 may only note that a second word has been extracted, without noting that numeric state has passed. The third selected word may be 'hundred', and counter state 403 may transition to numeric state 404 again. The fourth selected word may be 'stocks', and counter state 403 may transition to transaction subject state 406. Upon returning to counter state 403 after storage of 'stocks' in transition subject state 406, counter state 403 may note the extraction of the fourth word and that transaction subject state has been traversed. Similar transitions may occur from one state to counter state 403 to another state until a final transition to end state 412, due to the reaching the end of the transition, counting past the predetermined error tolerance threshold, determining that all required states have been entered and exited, or other exit conditions which may be programmed into the state machine 401. For example, counter 403 may determine that required states transaction instruction state 402, transaction subject state 406, and company state 410 have been visited, and that these states complete the transaction event within the interaction record. Counter state 403 may then transition to end state 412. Alternatively, counter state 403 may determine that no more words are left to be selected in the structured interaction record. Counter state 403 may then transition to end state 412.

Upon transitioning to end state 412, an interaction record validity check may be performed, and state machine 401 may determine whether an input of structured speech data is a valid interaction record that corresponds to a transaction event. If all required states have been traversed by state machine 401, end state 412 may output a transaction event table compiled from the stored linked list of words in each state, and a set of interaction data may be extracted from the transaction event table. If not all required states have been traversed by the state machine, then words stored in each state may be discarded. For example, counter 403 may have transitioned to end state 412 upon determining that no further words were left to be selected in the structured speech data input. Interaction record validity check may determine, for example, that only transaction subject state 406 and company state 410 were traversed, and the interaction record may be deemed invalid.

In one embodiment, an incomplete interaction record may be input into state machine 401. An incomplete interaction record may have no corresponding transaction data, or the interaction record may have incomplete information on transaction parameters communicated by parties preceding a transaction. State machine 401 receiving an incomplete interaction record may transition to end state 412 and may determine that the interaction record is invalid. Linked lists stored in states 402, 404, 406, 408 or 410 may then be discarded, and a transaction event table and interaction data may not be output by end state 412. The incomplete interaction record may be returned and stored, for example, in memory of the capture engine or speech recognition engine. In other embodiments, an interaction record may already be known as incomplete because a tagging engine may not have associated transaction data with it. In this case, the incomplete interaction record may not be sent to the state machine for analysis until a full interaction record is captured and tagged by the tagging engine.

FIG. 5A illustrates a transaction event table according to an embodiment of the invention. The linked lists stored in states 402, 404, 406, 408 or 410 (FIG. 4) may be organized and copied to a transaction event table 500. Items in transaction event table 500 may be sorted in ascending order according to the timestamp or location of each word. The transaction event table may include words selected from the structured interaction data 502, start time 504, end time 506, certainty 508, and lexicon category 510. Other information, depending on the configuration and algorithms used in the state machine, may be included.

FIG. 5B illustrates interaction data that may be extracted from the transaction event table 500. Interaction data 520 may include fields 522 that correspond to relevant transaction parameters. Interaction data 520 may describe each location in the interaction record that dictates which transaction parameters were discussed or requested by a customer. Interaction data 520 may include information such as the relevant word or words 524 that relates to each parameter, the words' start times 526, end times 528, and a field confidence 530.

A field confidence score 530 may be calculated for each field of the interaction data. The field confidence score 530 may indicate a likelihood or probability that the correct transaction field was detected from the interaction record. Calculation of the field confidence score may be based on, for example, the number of words detected that belong to the relevant lexicon category, for example, or the number of numeric words possible in the amount field; the word certainty scores determined in the speech data conversion step; and/or the average proximity or time between the relevant words. An amount field 521, for example, may be extracted from a series of words belonging to the numeric lexicon category (e.g. 'eight' and 'hundred'). Since the numeric field detection mechanism may allow some tolerance, some words belonging to other lexicon categories may exist between the numeric words. If words exist between the numeric words, for example, the proximity between the numeric words may be lower than if the numeric words are next to each other, and this may result in a lower field confidence score.

The field confidence score may be calculated using the following formula (other formulas may be used):

$$\text{Field Confidence} = FC = \left(1 - p\log_2\left(1 + \frac{1}{\sum_{i=1}^{N} C_i}\right)\right)$$

Where:

$C_i$ may represent the certainty score of $i^{th}$ word;

N may represent the number of words detected that belong to the relevant lexicon category; and may represent the average proximity between the relevant field words. P may be in the range of 0.1-0.5, for example.

In detection operation 210 of FIG. 2, an event confidence score or rating may be calculated, for example, based on the interaction data (FIG. 5B). An event confidence score may reflect the probability that the interaction data describes a transaction. In one embodiment the score range is between 0-1 where a low score reflects low probability that the transaction accurately matches the description of the transaction in the communications or interactions within the interaction record, and a high score reflects high probability that the transaction is an accurate match. Other score ranges may be used. The event confidence score may be based, for example, on the field confidence scores of the extracted interaction data fields.

Each interaction data field may have a different contribution or weight to the event confidence score. The different contribution may be reflected in a different weight value attached to each field confidence score. In one embodiment, close proximity between the event start time and the time when an agent or trader enters a trade into the trading system may increase the confidence.

The event confidence score may be calculated using the following formula (other formulas may be used):

$$\text{Event Confidence} = 100\left(1 - a\log_2\left(1 + \frac{1}{\sum_{i=1}^{N} w_i FC_i + P}\right)\right)$$

Where:

$FC_i$ is the confidence score of $i^{th}$ field;

N is the number of fields in the interaction data;

$W_i$ is the weight of the $i^{th}$ field;

a is a predetermined constant (a may be 0.35 by default, or may be empirically determined through statistical experiments. Other values may be used); and P may reflect the length of time between the transaction event's start time and when a trader entered trade parameters into a trading system. P may be an optional value to use.

For example, assuming that the event includes the following four fields with the following field confidence scores and predefined weights:

Transaction instruction field: event confidence=0.6, weight=1;

Transaction amount field: event confidence=0.8, weight=3;

Transaction subject field: event confidence=0.5, weight=1;

Transaction price field: event confidence=0.8, weight=3;

Transaction currency field: confidence=0.7, weight=1;

Transaction company field: confidence=0.7, weight=2;

And assuming that a=0.35 and P=0 the event confidence score may be calculated as:

$$EventConfidence = 100\left[1 - .35\log\left(1 + \frac{1}{\frac{0.6 + 0.8*3 + 0.5 + 0.8*}{3 + 0.7 + 0.7*2}}\right)\right]$$

$$= 83$$

If the event confidence score is higher than a threshold confidence score, an interaction data may be deemed detected within the interaction record. Interaction data 520 may be output by the detection step and compared with the transaction data to calculate a matching score. If the event confidence score is lower than a threshold confidence score, a transaction event is not detected, and the interaction record may be stored in the capture engine for later retrieval. If a transaction even is detected, a matching score may be determined based on the field confidence scores in the interaction data. The matching score represents the level of similarity between the transactional data entered into the trading system by a trader and the interaction between of the customer/trader. In some embodiments, the matching score reflects the similarity of the transaction details that were sent electronically by e-mail message, chat messaging, social media, other electronic messaging service, or other conversations by the customer, and the transactional data. The transaction data may be extracted from a trade order management system or from the trader's screen using screen capture or other sources. The matching score may be calculated using the following formula (other formulas may be used):

$$\text{match score} = \left(1 - a\log_2\left(1 + \frac{1}{\sum_{i=1}^{N} w_i FS_i + P}\right)\right)$$

Where:

$FS_i$ may be the field similarity between respective fields of the interaction data and transaction data of the $i^{th}$ field;

N may be the number of fields in the event;

$W_i$ may be the weight of the $i^{th}$ field; and a may be a predetermined constant, such as 0.35.

One embodiment may compile an interaction log that includes multiple interaction records related to multiple transaction events. An interaction log score may be calculated to evaluate an interaction resulting in multiple transactions. If one trader is responsible for one interaction with multiple transactions, the interaction log score may serve to describe the trader's overall performance or to estimate the probability that the vocal/textual interaction data matches the transaction data of multiple events. The interaction log score may be calculated based on the matching scores of each interaction record and corresponding transaction data in the interaction log. The interaction log score may be computed with the following formula (other formulas may be used):

interaction log score=100(c*MAX(MS)+(1−c)*Mean (MS))

Where:

MS may be the matching scores of each interaction record; and c may be a predefined constant in the range of 0-1 (c may be for example 0.7, or another suitable value).

Figure 6A:
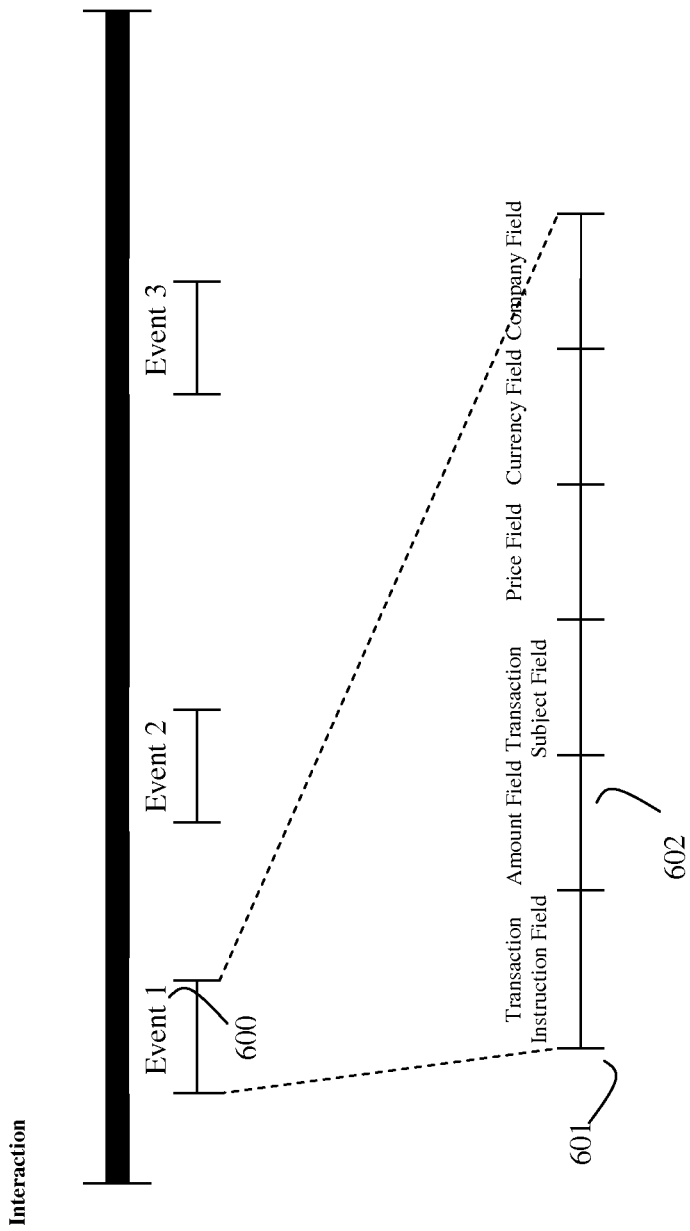
FIG. 6A is an illustration of multiple transaction events occurring within an interaction log, according to an embodiment of the invention.

FIG. 6A illustrates an interaction log that may include multiple interaction records relating to multiple transaction events. The interaction log may include a single interaction relating to multiple transaction records. For example, a first event 600 may correspond to an interaction record with interaction data 601. Interaction data 601 may represent the transaction parameters with data fields 602 and each of the data fields may represent different words spoken during the interaction that make up a transaction. Transaction events within the interaction log and associated with an interaction record may have different start times and end times. A matching score for each transaction event 600 may be calculated and an interaction log score may be calculated based on each matching score.

Figure 6B:
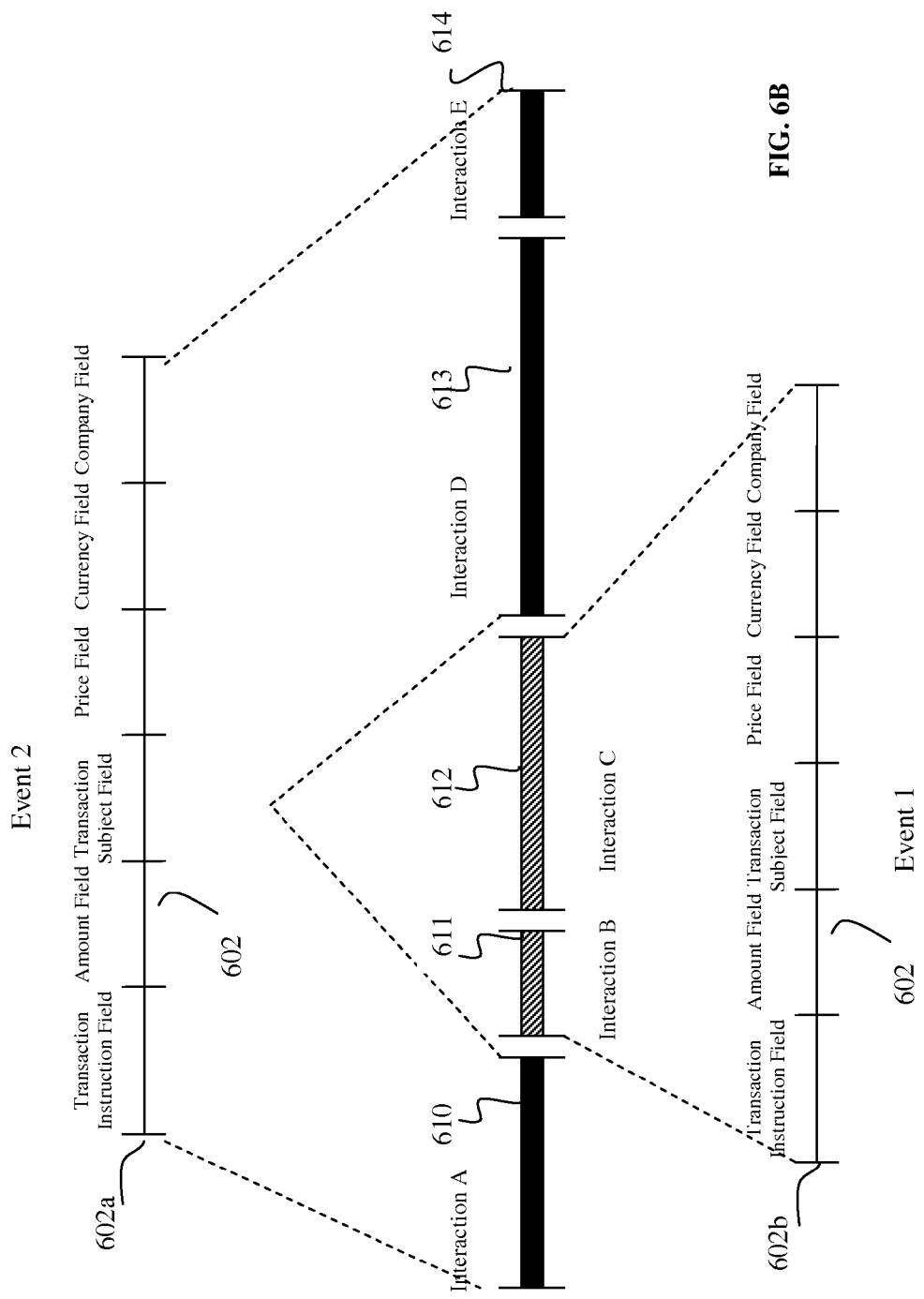
FIG. 6B illustrates multiple discrete interactions that may be related to one or more transaction events.

FIG. 6B illustrates multiple discrete interactions that may be related to one or more transaction events. For example one transaction event (Event 1) may correspond to three interactions: Interaction A 610, Interaction D 613, and Interaction E 614. These three interactions 610, 613, 614 may occur concurrently with different parties or at different times. The interactions 610, 613, 614 may be in any communication format including SMS messaging, e-mail messaging, telephone communications, facsimile, or other formats. Together, the interactions 610, 613, and 614 may constitute an interaction record describing communications between parties about desired transaction parameters. Interaction data 601a may be extracted from the interaction record that includes interactions A 610, D 613, and E 614, and may include data fields 602 that relate to transaction parameters. Another event (Event 2) may correspond to two other interactions: Interaction B 611 and Interaction C 612. These two interactions 611 and 612 may occur concurrently with different parties or at different times. Chronologically, Interactions B 611 and C 612 may occur between the three interactions 610, 613, and 614 that constitute Event 1. Interaction data 601b may be extracted from an interaction record that includes Interactions B 611 and C 612.

Figure 7:
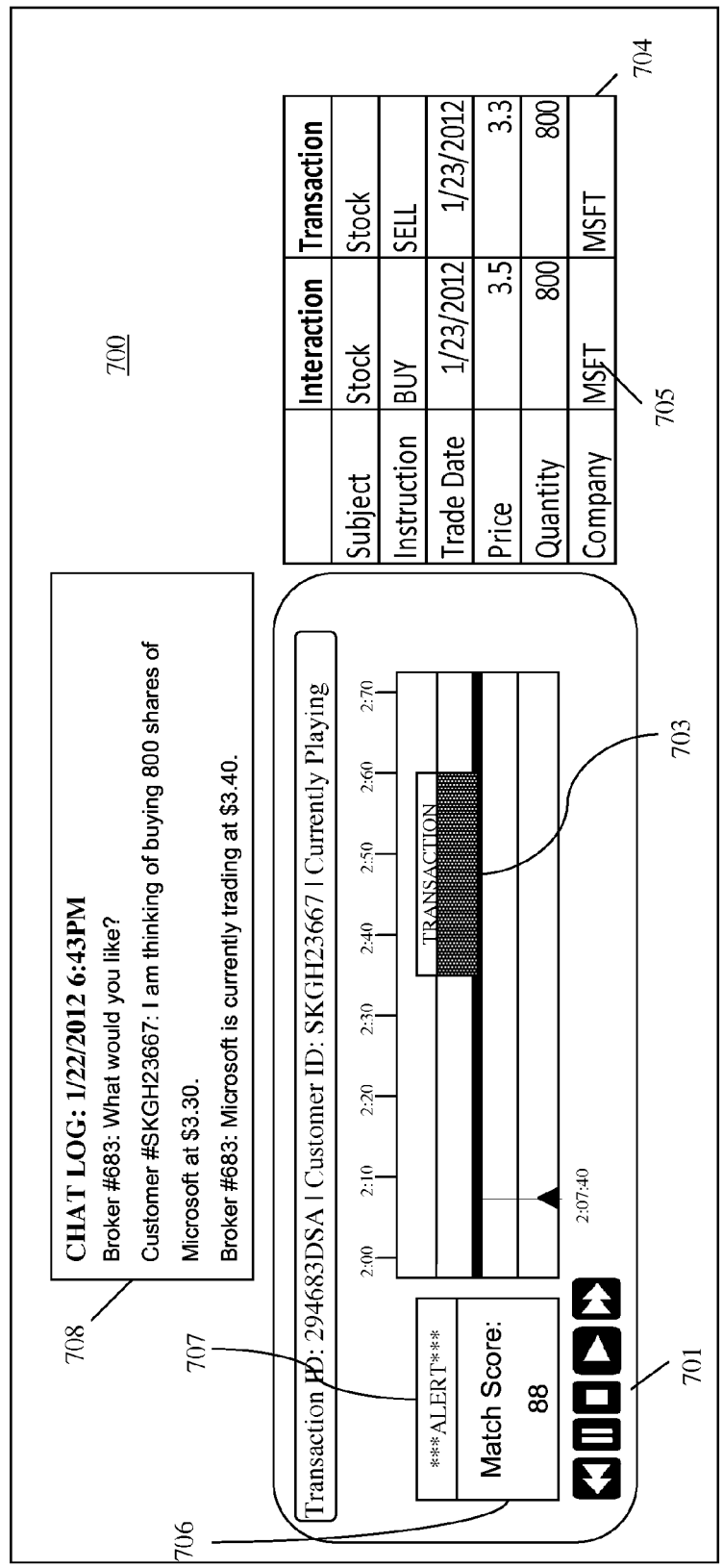
FIG. 7 is a display of an interaction record, transaction data, and a matching score, according to an embodiment of the invention.

FIG. 7 illustrates a display of an interaction record, transaction data, and a matching score. The display 700 may include playback capability 701 of an interaction record 702. A user may be able to view a transaction event 703 with the interaction record, and replay the specific transaction event. A log of data communication 708, such as a chat log or e-mail log, between parties may be also displayed. The display 700 may include a review of the transaction data 704 from the trade input into a trading system. The transaction data 704 may be viewed alongside the interaction data 705, allowing the viewer to make a visual comparison of the interaction 705 and transaction data 704. A matching score 706 may also be displayed alongside the interaction. If the matching score 706 is lower than a pre-defined threshold, an alert 707 may also be displayed, warning a trader or others within an organization that an incorrect transaction was submitted into an order management system.

Figure 8:
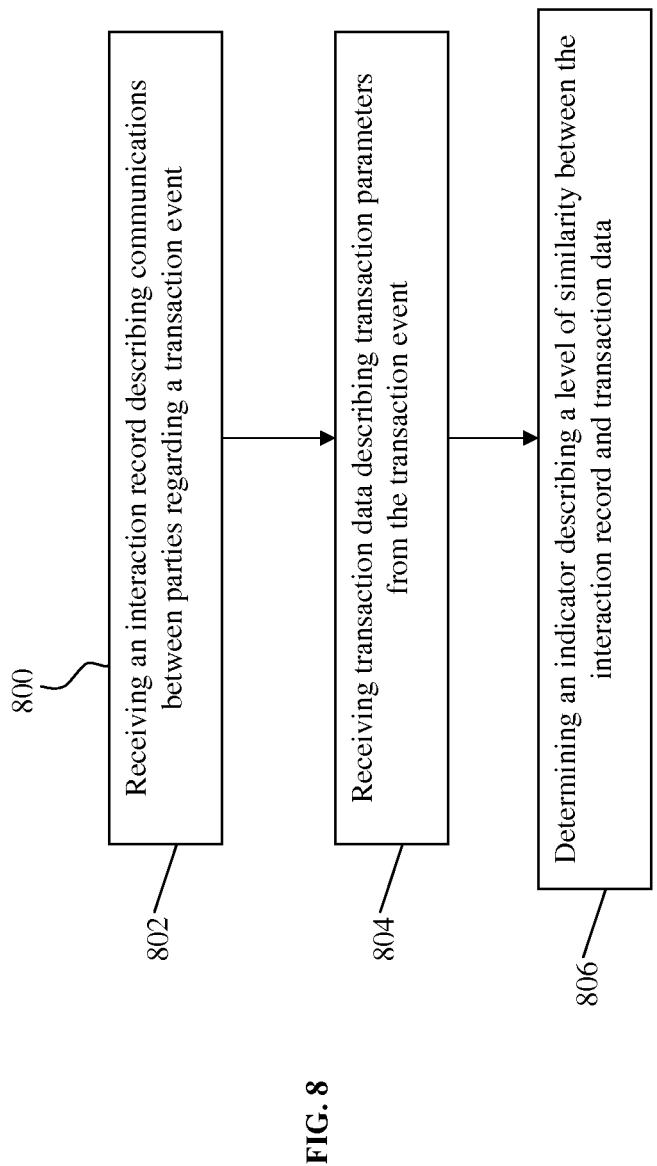
FIG. 8 is a flowchart of a method of transaction verification, according to an embodiment of the invention.

Reference is made to FIG. 8, which is a flowchart of a method 800 for verifying a transaction, according to an embodiment of the invention. In operation 802, a processor may receive a set of communications or an interaction record describing communications between parties regarding a transaction event. One or more interactions relating to a transaction event may be captured by a capture server and grouped together into an interaction record. A tagging engine, for example, may tag each captured interaction with identifying information or tag each compiled interaction record with identifying information. The interaction record may correspond with transaction data that describes transaction parameters input into a trading system.

In operation 804, a processor may receive transaction data describing transaction parameters from the transaction event. After one or more communications with a customer, for example, a trader or other business representative may input transaction parameters into a trading system. The transaction data may be stored in an order management system or sent to a processor for verification that the transaction data is similar to communications or interactions between two parties describing desired transactions.

In operation 806, a processor may determine an indicator describing a level of similarity between the interaction record and transaction data. The indicator may be a matching score that describes how accurately a transaction matches the description of a transaction communicated between two parties. The matching score may be based on a comparison between interaction data and transaction data. Interaction data may be detected within an interaction record and describe the transaction parameters communicated by at least one party in the interaction record. The respective fields of the interaction data and transaction data may be compared to determine a matching score or indicator.

Other operations or orders of operations may be used.

It may be appreciated that although embodiments of the invention are described to operate in real-time, such embodiments may also operate off-line, for example, at a later time. In one embodiment, interactions may be recorded and resolved, for example, at a predetermined time or time delay after the interactions.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for transaction verification, comprising:
    receiving an interaction record describing communications between parties regarding a transaction event;
    receiving transaction data describing transaction parameters from the transaction event; and
    determining, by a processor, an indicator describing a level of similarity between the interaction record and transaction data.

2. The method of claim 1, wherein the communications between parties are in at least one communication format selected from the group consisting of voice communication, data communication, and in-person communication.

3. The method of claim 1, comprising associating an identification with the interaction record and transaction data.

4. The method of claim 1, comprising converting unstructured speech data from the interaction record into structured speech data, wherein the structured speech data describes words used in an interaction and location of the words in the interaction record.

5. The method of claim 1, comprising:
    detecting interaction data within the interaction record, the interaction data comprising transaction parameters described by at least one party in the interaction record;
    extracting interaction data from the interaction record; and
    comparing the interaction data with the transaction data.

6. The method of claim 5, wherein detecting interaction data within the interaction record comprises:
    determining, by a processor, an event confidence score indicating a probability that the interaction data describes the transaction;
    comparing the event confidence score to a threshold confidence score; and
    detecting interaction data if the event confidence score is greater than or equal to the threshold confidence score.

7. The method of claim 5, wherein determining, by a processor, an indicator describing a level of similarity between the interaction record and transaction data is based on the comparison between the interaction data and the transaction data.

8. The method of claim 5, wherein comparing the interaction data and transaction data comprises comparing respective data fields of the interaction data and the transaction data.

9. The method of claim 1, comprising:
    receiving an interaction log comprising a plurality of interaction records describing communications regarding a plurality of transaction events;
    receiving a plurality of transaction data describing transaction parameters from the plurality of transaction events;
    determining an interaction log score based on indicators describing the similarity between each transaction record and corresponding transaction data.

10. The method of claim 1, comprising generating an alert if the matching score is below a pre-defined threshold matching score.

11. The method of claim 1, comprising displaying, by a processor, the interaction record, the transaction data, and the matching score in one visualization.

12. A transaction verification system, comprising:
    a memory storing interaction records and corresponding transaction data; and
    a processor to:
        receive an interaction record describing communications between parties regarding a transaction event, the transaction record in at least one communication format selected from the group consisting of voice communication, data communication, and in-person communication;
        receive transaction data describing transaction parameters from the transaction event; and
        determine a matching score indicating a level of similarity between the interaction record and transaction data.

13. The transaction verification system of claim 11, wherein the processor is to associate an identification to the interaction record and transaction data.

14. The transaction verification system of claim 11, wherein the processor is to convert unstructured speech data from the interaction record into structured speech data, the structured speech data describing words used in an interaction and location of the words in the interaction record.

15. The transaction verification system of claim 11, wherein the processor is to:
    detect interaction data within the interaction record, the interaction data comprising transaction parameters described by at least one party in the interaction record;

extract interaction data from the interaction record; and
compare the interaction data with the transaction data.

16. The transaction verification system of claim 11, wherein the transaction event describes a trading floor transaction.

17. A method comprising:
receiving a plurality of communications describing a transaction;
determining an indicator describing how accurately the transaction matches the description of the transaction in the plurality of communications.

18. The method of claim 17, wherein the plurality of communications between parties are in communication formats selected from the group consisting of voice communication, data communication, and in-person communication.

19. The method of claim 17, comprising associating an identification with the plurality of communications records and transaction.

20. The method of claim 17, comprising converting unstructured speech data from the plurality of communications into structured speech data, wherein the structured speech data describes words used in communications.

* * * * *